Sept. 7, 1965  S. THORBURN ETAL  3,204,448
GRAVIMETRIC DETECTOR FOR GAS CHROMATOGRAPHY
Filed Nov. 21, 1962
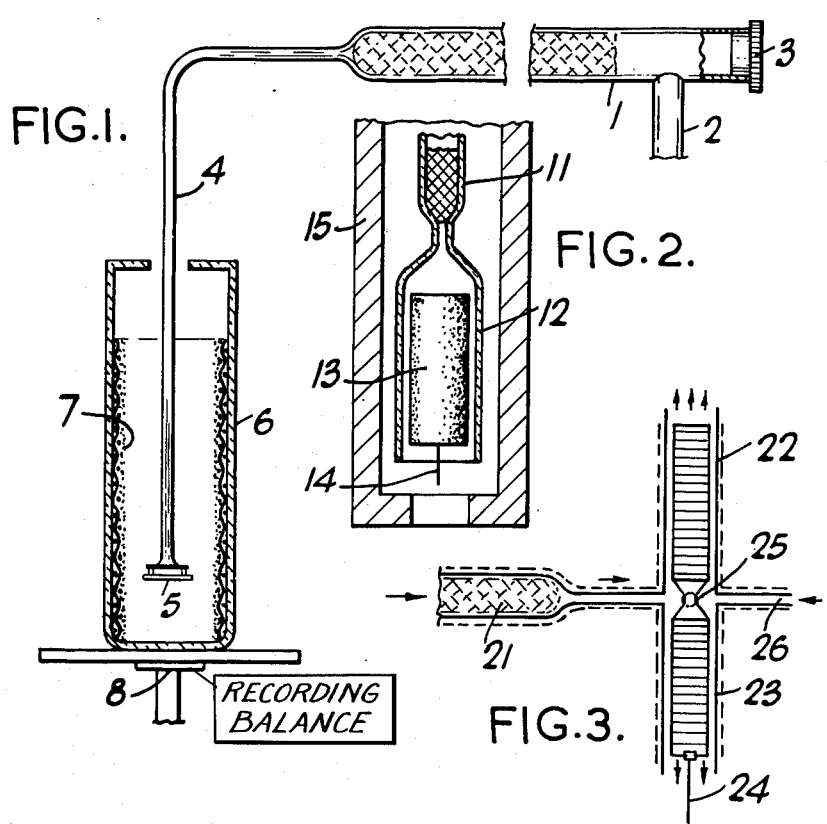
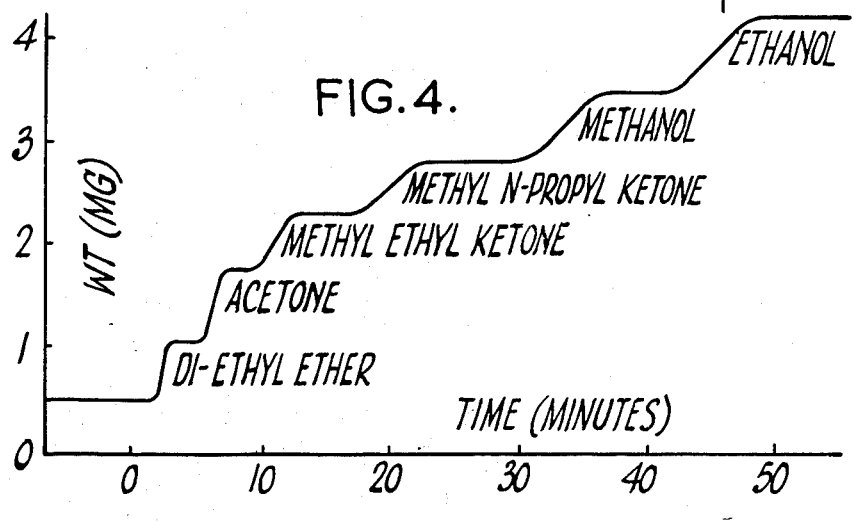

3,204,448
GRAVIMETRIC DETECTOR FOR GAS CHROMATOGRAPHY
Samuel Thorburn, Isleworth, and Stanley Cecil Bevan, Southall, England, assignors to National Research Development Corporation, London, England, a British corporation
Filed Nov. 21, 1962, Ser. No. 239,238
Claims priority, application Great Britain, Nov. 24, 1961, 42,017/61
6 Claims. (Cl. 73—23.1)

This invention relates to apparatus for gas chromatographic processes. Such processes are used for the separation and/or analysis of gaseous mixtures, and this term is understood in the art to include vapour, or vapourisable liquid, mixtures. The invention concerns, more particularly, the process wherein a measured sample to be separated or analysed is introduced into a stream of carrier gas, such as nitrogen or hydrogen, which is arranged to sweep the sample, as gas or vapour, through a so-called, column containing a separating agent, the function of which is to retain the components of the sample for different periods of time (the so-called retention times), so that the various components appear at the end of the column substantially separately. Egress of the different components from the column is sensed by a detector which indicates a difference of composition of the effluent.

The invention has particular reference to such detectors. Many forms of detectors have been proposed, for example a gas density balance, a thermal conductivity detector, a flame temperature detector, a glow discharge detector, a capacitive detector, an ultrasonic detector, an ionising gage detector, and a thermistor detector, but all suffer from one or more disadvantages, such as non-linearity of response, uneven response to compounds of different chemical types, expense, fragility, instability, insensitivity, or involving destruction of the sample. It is an object of the present invention to provide a detector which operates on a different principle and which may have advantages over known forms of detector.

In accordance with one aspect of the invention, a detector for a gas chromatographic column comprises means adapted to fix one or more components of a sample as they emerge from the column, the resulting change of mass of the said means representing the mass of the or each component or one or more selected components of the sample. Thus the detector may give a continuous measure of the sample accumulated from the beginning of an analysis. If the change of weight is recorded, the record will appear as a series of steps, the number of which will depend on the number of components in the sample or of those components under observation, such a record being known as an integral chromatogram; the interpretation of the chromatogram will be dependent upon the particular parameters in use.

According to another aspect of the invention, in a chromatographic process, the effluent from a chromatographic column is passed to absorptive detector means, the change in weight of which, resulting from the arrival of absorbable gas or vapour, may be followed by an observer using a weighing device or caused to operate a balance equipped with an automatic weight-recording attachment, said weight changes being used as an indication of the relative or absolute proportions of the constitutents.

In accordance with yet another aspect of the invention, the detector for a chromatographic column comprises means for physically or chemically fixing components emerging from the column in succession, so that a weight-time characteristic of the detector may be used to indicate the mass of a or each component or the masses of certain components determined by the use of a selective fixative or absorber.

In detectors in accordance with the invention, an absorptive medium of, preferably, large surface area, may be provided which will absorb all components, or selected components only, of the sample being analysed, and means leading from the end of the column is or are arranged to present the stream or part thereof of carrier gas to the fixative or absorber.

In order to minimise, or prevent, errors due to impingement of the carrier stream on the detector, the detector may take a form devised to produce compensatory flow.

In a detector in accordance with the invention the constituents of a sample can be completely recovered.

The invention will now be described by way of examples with reference to the accompanying drawings, which show various forms of detector embodying the invention.

FIGURE 1, which is somewhat diagrammatic, shows a detector in the form of a glass absorption cell containing glass cloth carrying sulphuric acid; FIGURE 2 shows an alternative form of detector, which can be part of an extension to a chromatographic column; FIGURE 3 shows a more elaborate, compensated type of detector; and FIGURE 4 is a typical integral mass chromatogram obtained using a detector in accordance with the invention.

In FIGURE 1 a chromatographic column 1 containing a filling of 80–100 mesh "Celite" with 10 percent polyethylene glycol is provided with an entry 2 at one end for a stream of carrier gas and an entry 3, such as a serum cap, for the injection of the sample. At the other end, the column is provided with a thin glass capillary 4 having its outer end 5 formed as a baffle so that the issuing gas flows in directions opposite to each other substantially horizontally so as to compensate for the force of the gas flow on the absorptive cell 6. The filling of the column 1 is approximately 120 cm. by 0.5 cm. diameter and the capillary 4 is about 0.5 mm. internal diameter. The cell 6 which may be a simple glass weighing bottle, is approximately 1.3 cm. diameter by 4.5 cm. high and contains a piece of glass cloth 7 approximately 7.5 cm. by 5 cm. suitably folded to fit within the vessel with its bottom end close to the bottom of the vessel; approximately 2 g. of concentrated sulphuric acid, having been introduced into the cell 6, appears in the interstices of the glass cloth. As a result, any absorbable components, from the sample introduced through the cap 3, for instance by hypodermic needle, and issuing eventually from the baffle end 5, is absorbed by the acid and is retained thereby, the carrier gas being inert and passing out of the cell.

In one particular application of the cell as a detector, the cell was placed on a pedestal 8 forming part of a beam recording balance (in this case, a Stanton automatic thermo-recording balance model TR–01, supplied by Stanton Instruments Limited, 119 Oxford Street, London, W. 1.), and changes in the weight of the vessel due to the absorption of the fractions was followed on the recorder. FIGURE 4 illustrates the type of record obtained for a sample containing di-ethyl ether, acetone, methyl ethyl ketone, methyl, n-propyl ketone, methanol and ethanol components. It was found that, in the run yielding the example graph of FIGURE 4, where a column comprised alkali treated "Celite" of 80–100 mesh with 10 percent "Carbowax" 800 at a temperature of 20° C. and was operated using nitrogen as a carrier gas with an inlet pressure of 3 pounds per square inch and a flow rate of 25 ml. per minute, that the fractions of the sample were recorded to an accuracy of 1 to 2 percent. It will be noted that the graph reflects (i) the different retention times of the various components by reason of the distances of the steps from the origin, measured along the time axis and (ii) the efficiency of the column by reason of the different slopes of the incremental portions of the curve. In this type of run it should also be noted that time could possibly be saved by arranging for the flow of carrier gas, which is normally substantially constant, to be increased momentarily between the indicated intervals between issuance of the succeeding components, thereby permitting the sample to be completely analysed within a shorter period.

In the arrangement illustrated in FIGURE 2, the end of the column 11 is arranged to terminate in a hood 12 within which is arranged absorptive medium 13 which is arranged externally on a support attached to the weight sensitive extension 14 of a recording balance. If desired, the column and the hood may be surrounded by a heating jacket 15, if the analysis is to be carried out at elevated temperatures.

In this arrangement, there is a possibility of any changes, which occur in the velocity of egress of carrier gas, affecting the balance and rendering the record inaccurate. In the arrangement shown in FIGURE 3 therefore, the carrier gas is arranged to emerge in two directions opposite to each other so as substantially to counteract this effect on the balance; thus, the end of the column 21 is formed as a composite hood having oppositely directed portions 22 and 23, and the absorptive member, carried by the balance extension 24, is similarly formed as a two-part carrier for the absorptive medium.

The whole of the hood and the column may be surrounded by a suitably formed heating jacket as indicated by the dotted lines. In order to obtain cooling, if necessary, for the absorptive medium, oppositely directed ports 25, of which only one is indicated in the drawing, may be provided for the introduction of cooling gas to the hood; and in some cases, where extra sensitivity is required, it may be desirable to provide a flow of gas to compensate for the gas stream emerging from the column, and for this purpose an additional port 26 may be provided.

It will be seen that the invention provides a means whereby integral chromatograms, which serve to give the gravimetric composition of a sample directly, may be obtained and, because it can be made very simple, the integral mass detector provided by the invention offers important advantages over most of the established detection systems. Since it is a matter of measuring the fundamental mass parameter of the various components of samples under test, molecular response factors can be eliminated, leading to simplification in obtaining the gravimetric composition of the sample. Moreover a detector in accordance with the invention can retain the various components and, still further, the need for an integrator is eliminated.

It is, of course, to be understood that, if necessary, arrangements may be made for the effluent from a column to be diverted through a number of individually sealable outlets, each outlet being associated with its own detector, whereby individual components or combinations of components of a sample may be detected separately and, if desired, retained separately.

A mass detector may be devised in accordance with the invention for any size of sample, and although it has been described in association with a column of packed form, it is to be understood that its use is not so limited; any form of column may be used.

We claim:
1. A detector for a gas chromatographic column comprising gas fixative means, a capillary gas passage for delivering a stream of effluent gas from the column into contact with the gas fixative means, said passage having a delivery end disposed closely adjacent to the gas fixative means, means supporting the gas fixative means freely of said passage, and means responsive to changes in the mass of said gas fixative means.

2. A detector for a gas chromatographic column as claimed in claim 1, having a recording means, said recording means providing an indication of weight-change of said fixative means with time, whereby the mass of gas fixed thereby may be obtained.

3. A detector for a gas chromatographic column as claimed in claim 1, wherein said gas fixative means comprises sorption means sensitive to at least one selected component of the gas from the column, whereby the mass of said selected component may be obtained.

4. A detector for a gas chromatographic column comprising gas fixative means in the form of an absorptive medium contained within and held in extended area form at the walls of a tubular vessel, a gas passage for delivering a stream of effluent gas from the column into contact with the gas fixative means, said passage having a delivery end disposed within said tubular vessel, means supporting said tubular vessel freely of said passage, and means responsive to changes in the mass of the gas fixative means.

5. A detector as claimed in claim 1, wherein said absorptive medium is held in a base of woven glass cloth.

6. A detector for a gas chromatographic column comprising gas fixative means having two portions, a gas passage having two parts within which said portions are respectively disposed and having a further part for delivering a stream of effluent gas from the column into contact with the gas fixative means, the parts of said passage being interconnected so that the gas stream flowing through said further part will flow through said two parts compensatively in relation to the fixative means, means supporting the gas fixative means freely of said passage, and means responsive to changes in the mass of the gas fixative means.

References Cited by the Examiner

UNITED STATES PATENTS 1,542,242 6/25 Hartung _____ 23—232

FOREIGN PATENTS 492,611 2/30 Germany.

OTHER REFERENCES

James & Martin in International Congress on Analytical Chemistry, vol. 77. December 1952, pages 915 to 920.

James in Vapour Phase Chromatography, London 1956, edited by Desty. Butterworths Scientific Publications, London, 1957.

RICHARD C. QUEISSER, *Primary Examiner.*

JOSEPH P. STRIZAK, LOUIS R. PRINCE, *Examiners.*